United States Patent [19]

Gocke

[11] 4,089,461

[45] May 16, 1978

[54] THERMOSTATIC RADIATOR VALVE

[75] Inventor: Eberhard Gocke, Mosbach, Germany

[73] Assignee: Braukmann Armaturen A.G., Rothrist, Switzerland

[21] Appl. No.: 702,772

[22] Filed: Jul. 6, 1976

[51] Int. Cl.² ............................................. F24F 11/00
[52] U.S. Cl. .................................... 236/42; 236/100
[58] Field of Search ................ 236/42, 43, 100, 12 R, 236/99 I; 192/82; 29/442

[56] References Cited

U.S. PATENT DOCUMENTS

| | | | |
|---|---|---|---|
| 1,794,611 | 3/1931 | Halsey | 236/42 |
| 1,811,418 | 6/1931 | Miller | 236/42 |
| 1,920,896 | 8/1933 | Shivers | 236/42 |
| 2,520,442 | 8/1950 | Schwartz | 403/229 |
| 3,067,944 | 12/1962 | Meier | 236/42 |
| 3,241,760 | 3/1966 | Bailey | 236/100 |

FOREIGN PATENT DOCUMENTS

| | | | |
|---|---|---|---|
| 1,250,222 | 9/1967 | Germany | 236/42 |

*Primary Examiner*—William E. Wayner
*Assistant Examiner*—Robert Charvat
*Attorney, Agent, or Firm*—William T. Howell

[57] ABSTRACT

A thermostatic radiator valve has a spring loaded thermostat located in a rotatable member with the spring bearing against the thermostat and the rotatable member, the latter having arms surrounding the thermostat, the free end of each arm having a radially inwardly projecting extension which bears against the loading spring.

6 Claims, 3 Drawing Figures

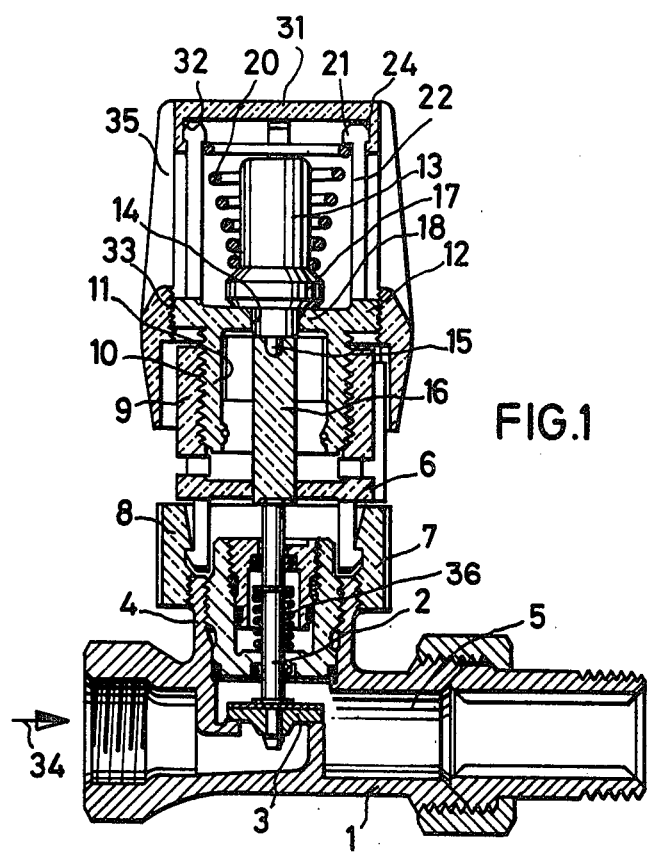
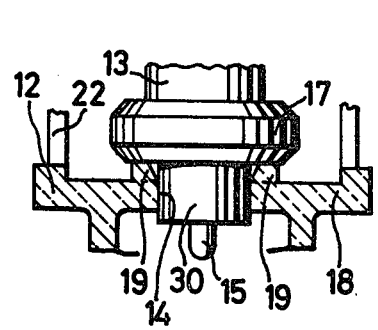
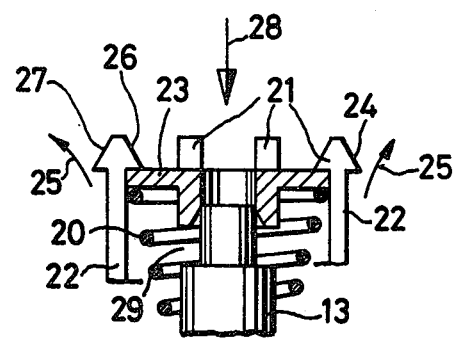

THERMOSTATIC RADIATOR VALVE

FIELD OF THE INVENTION

The invention relates to a thermostatic radiator valve having a spring loaded thermostat located in a rotatable member, with the said spring bearing against the said thermostat and the said rotating member.

PRIOR ART

The rotatable member in the valve has one or more passages through which ambient air may flow and thus reach the thermostat. The rotatable member is connected by means of a thread to the radiator valve, or to an extension secured thereto. As a result of this, the surface supporting the loading spring at the rotatable member end executes a movement either towards or away from the valve seat, depending upon the direction in which the said rotatable member is rotated. This applies a load to, or relieves the load from, the loading spring, which means that more or less force is required to open the valve. The said loading spring thus assumes the function of a safety device against overheating.

Assembly of the thermostat and loading spring requires special tools and accessories and is therefore costly and time consuming, and any repairs to previously known thermostat radiator valves, especially to the thermostats thereof, are therefore complicated. Furthermore, if the thermostat is replaced, the rotating member is often damaged or even destroyed.

SUMMARY OF THE INVENTION

It is therefore the purpose of the present invention to provide a thermostat radiator valve of the type described above, in which the thermostat and the loading may be assembled or replaced simply, quickly and without expensive tools.

It is proposed to achieve this purpose by means of a thermostat radiator valve in which the arms of the rotatable member preferably run approximately parallel with the valve stem and the longitudinal axis of the thermostat. The latter is assembled, for example, after the rotatable member has been screwed in, in a connecting piece fitted to the radiator valve, above the aperture defined by the free ends of the arms. After the thermostat has been connected to the valve stem, or to an extension thereof, the loading spring is mounted, in the same direction as was the thermostat, in the space defined by the arms. As soon as the spring has passed right by the extensions fitted to the free ends of the arms, the spring is released, whereupon the outer end thereof bears against the inwardly projecting extensions of the arms, the said thermostat being thus securely held in the rotating member. However, the thermostat and the loading spring may also be assembled before the rotatable member is screwed in, since if the rotatable member is removed, or not screwed in, since if the rotatable member is removed, or not screwed in very far, the thermostat bears against the said rotatable member. Upon insertion, the spring should be radially compressible; instead of, or in addition to, this, the free ends of the arms may be sprung resiliently outwards for assembly of the spring and, possibly, of the thermostat. In this connection, it is particularly desirable for the arms and the rotatable member to be in one piece, more particularly in the form of a plastic injection moulding.

Two arms at 180° to each other, each with an inwardly projecting extension, suffice to support the outer end of the spring. In practice, however, at least three and preferably more arms with inwardly projecting extensions will be used, and it is desirable that each arm be fitted with an inwardly projecting extension. The width of the said arms, and the distance between them in the peripheral direction of the rotatable member, are governed by thermostat ventilation requirements.

According to a further configuration of the invention, a pressure disc is interposed between the loading spring and the extensions on the arms of the rotatable member. This pressure disc may be inserted into the space in the rotatable member defined by the arms in the same way as the thermostat and the loading spring were previously inserted. In assembling at least the loading spring and the pressure disc, it is particularly desirable that the free ends of the arms be provided with chambers by means of which the said arms may easily be expanded radially. Furthermore, the inwardly projecting extensions need not necessarily be located at the free ends of the arms. Instead, should other requirements make it necessary, the said extensions may be located at a greater or lesser distance from the said free ends.

According to still another configuration of the invention, the pressure disc has a central bore serving to guide the thermostat or an element connection thereto. The thermostat is thus guided in the direction of displacement at both ends, and the said pressure disc therefore fulfills two functions.

According to another variant of the invention, the free end of each arm has an extension projecting radially outwards and engaging in an annular groove in a rotatable knob. The outwardly projecting extensions on the free ends of the arms make it possible to snap this knob onto the rotatable member, upon which it may be secured against rotation by means of serrations, for example. Naturally, the rotatable knob also has corresponding apertures preferably arranged as radial extensions of the spaces between the arms of the rotating member. Here again, it is highly desirable for the outwardly projecting extensions to be chamfered. If a pressure disc is used, this chamfering must not prevent the rotating knob from being snapped on.

According to still another characteristic of the invention, the loading spring may be in the form of a conical coil spring, with the larger diameter end bearing against the inner extensions to the arms. It is desirable for the thermostat to be supported on three lugs, cams, or the like on the rotatable member, upon which it rests, for example, when the unit consisting of the rotatable knob, the rotatable member, the thermostat, and the loading spring, is removed or pre-assembled. The said thermostat may also rest upon the said lugs when the rotatable member is screwed only slightly onto the valve or onto an intermediate part.

DESCRIPTION OF THE DRAWINGS

The invention will now be described in relation to the accompanying drawings, in which:

FIG. 1 is a vertical section through the thermostat radiator valve according to the invention;

FIG. 2 is a detail from FIG. 1, on an enlarged scale;

FIG. 3 is also a detail from FIG. 1, on an enlarged sacle, with an additional pressure disc.

DESCRIPTION OF A PREFERRED EMBODIMENT

Housing 1 of the thermostat radiator valve, valve stem 2 with its valve plate 3, and all parts contained in neck area 4 for sealing inner chamber 5 of the valve, and for guiding and sealing the valve stem, may be of conventional design. The same applies to cap 6 which is secured to threaded ring 7 by means of a snap connection 8. Tubular part 9 of cap 6 has an internal thread 10 into which threaded connector 11 of a rotatable member 12 is screwed to a greater or lesser extent. Thermostat 13 passes through a central bore 14 in rotatable member 12, working piston 15 of the said thermostat engaging in a slot, or central opening, in pin-shaped stem extension 16. In FIG. 1, collar 17 of the thermostat lies flat on bottom 18 of rotatable member 12, whereas in FIG. 3 it rests upon three cams 19 distributed uniformily in the peripheral direction, being kept in this position by loading spring 20 in the form of a conical coil spring, the smaller diameter inner end of which bears against collar 17, whereas the larger diameter outer end bears against a plurality of inwardly projecting extensions 21 of arms 22 distributed uniformily around the periphery. As shown in FIG. 3, this support may be effected indirectly by means of a pressure disc 23.

Arms 22 are manufactured in one piece with rotatable member 12, and they run preferably parallel with the longitudinal axis of valve stem 2 and thermostat 13. Rotatable member 12 preferably has at least three arms 22 distributed uniformily around the periphery thereof, each of the said arms being provided with an inner extension 21 and a radially outwardly projecting extension 24, the purpose of which will be explained hereinafter. Arms 22 are adapted to bend resiliently in the direction of arrow 25. Inwardly projecting extensions 21 have chamfers 26 and outwardly projecting extensions 24 have chamfers 27.

Thermostat 13 is inserted, in the direction of arrow 28, into the interior 29 of rotatable member 12. Journale shaped extension 30 of the said thermostat is held in central bore 14 of rotatable member 12. Loading spring 20 is then introduced in the same direction, until it engages under inner extensions 21, to which end arms 22 may be forced radially outwards and then allowed to spring back again. The introduction of the spring, and possibly that of pressure disc 23, is facilitated by chamfers 26 on inner extensions 21. A cup shaped rotatable knob 31 is then slipped over rotatable member 12, at which time outer extensions 24 snap into annular groove 32. The said rotatable knob is also connected positively to, and secured against rotation on, rotatable member 12 by means of serrations 33 or the like.

The medium, for example hot water, flows into housing 1 in the direction of arrow 34, at which time the valve is opened by the lifting of valve plate 3. As a result of this, thermostat 13 is lifted from top 18, or cams 19, against the force of loading spring 20. When collar 17 of the said thermostat rests upon top 18 or cams 19, the force of the loading spring can no longer act upon valve stem 2. For this reason, a closing spring 35 is also provided for valve plate 3. By screwing in rotatable member 12 to a greater or lesser extent, it is possible to achieve a connection without play between thermostat 13, stem extension 16, and stem 2, even when collar 17 is resting upon top 18 or cams 19. Ambient air, the temperature of which controls the thermostat radiator valve, reaches the housing of thermostat 13 through radial slots 35 in rotatable knob 31 and the spaces between arms 22.

I claim:

1. A thermostatic radiator valve having in combination an apertured housing, a valve seat in said housing, a valve plate engageable with said valve seat, a valve stem having one end secured to said valve plate with the other end extending outwards of said housing through said aperture in said housing, a spring loaded thermostat operable against said other end of said valve stem and a rotatable member having means for sealing securement to said housing at said aperture, said spring bearing against thermostat and said rotatable member characterised in that the latter has resilient arms surrounding said thermostat concentrically with each of said arms having, at least partly in the vicinity of its free end a radially inwardly projecting extension against which bears said spring.

2. A radiator valve according to claim 1, characterized in that a pressure disc is interposed between said loading spring and the inwardly projecting extensions.

3. A radiator valve according to claim 2, characterized in that said pressure disc is provided with a central bore as a guide for said thermostat.

4. A radiator valve according to claim 1, characterized in that the free end of each arm has a radially outwardly projecting extension, a rotatable knob on said rotatable member, an annular groove in said rotatable knob, said extension engaging in said annular groove.

5. A radiator valve according to claim 1, characterized in that the loading spring is in the form of a conical coil compression spring, the larger diameter end of which bears against the inwardly projecting extensions of the arms.

6. A radiator valve according to claim 1 characterised in that said thermostat may be supported on three lugs cams on said rotatable member.

* * * * *